UNITED STATES PATENT OFFICE.

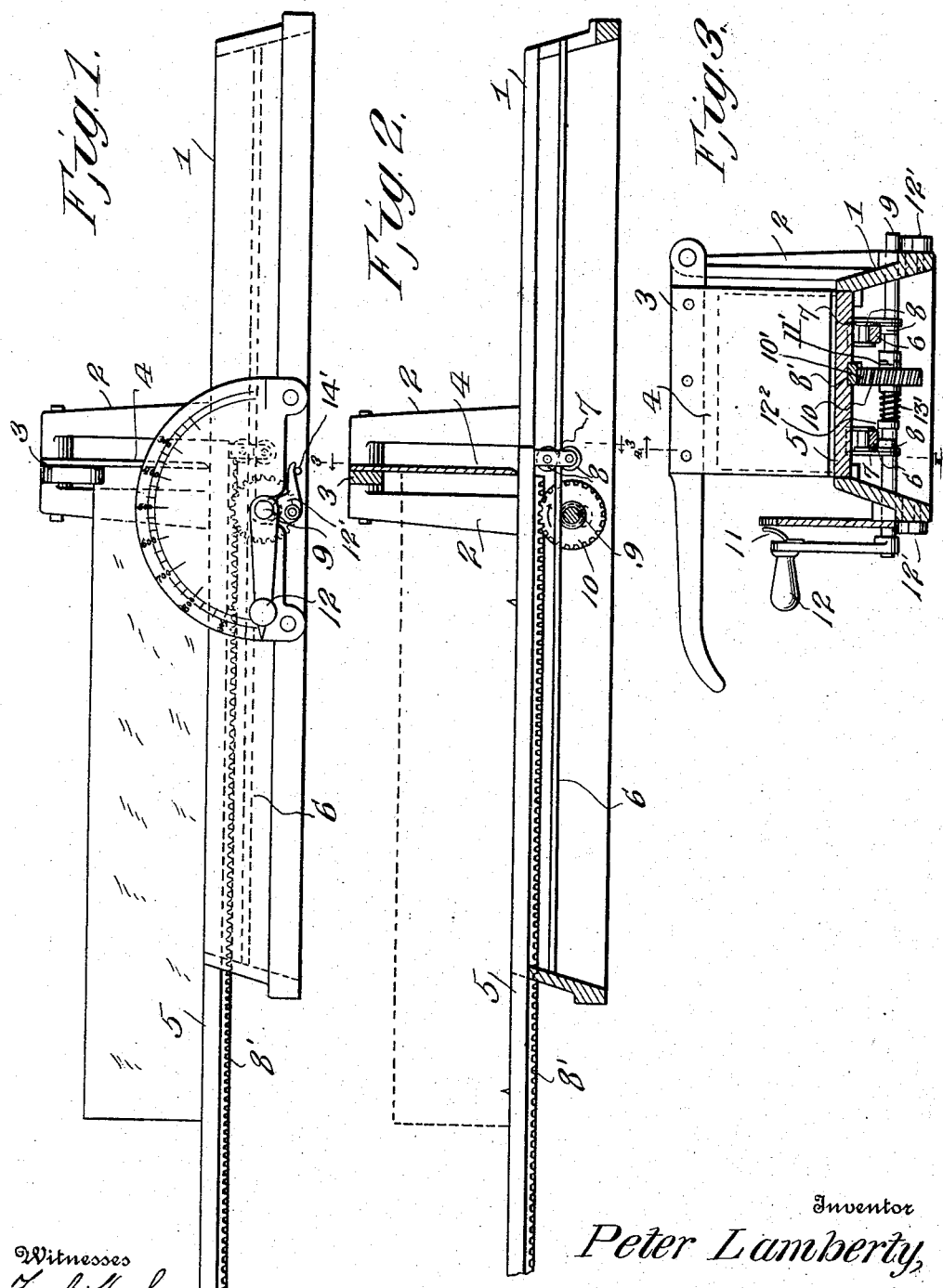

PETER LAMBERTY, OF SPRINGFIELD, OREGON.

CHEESE-CUTTER.

1,175,155.  Specification of Letters Patent.  Patented Mar. 14, 1916.

Application filed July 8, 1914. Serial No. 849,810.

*To all whom it may concern:*

Be it known that I, PETER LAMBERTY, a citizen of the United States, residing at Springfield, in the county of Lane and State of Oregon, have invented new and useful Improvements in Cheese-Cutters, of which the following is a specification.

This invention is an improved cheese cutter for measuring and cutting cheese in slices or pieces of any desired thickness and especially for use for cutting Swiss cheese and protecting the cut end thereof to prevent the same from drying out, the object of the invention being to provide an improved device of this character which is cheap and simple, is strong and durable, which may be readily operated and is not likely to get out of order.

The invention consists in the construction, combination and arrangement of devices hereinafter described and claimed.

In the accompanying drawings:—Figure 1 is a side elevation of a cheese cutter constructed in accordance with my invention. Fig. 2 is a longitudinal central sectional view of the same. Fig. 3 is a vertical transverse sectional view of the same.

The base 1 of my improved cheese cutter is of oblong rectangular form, is hollow and has upwardly converging end and side walls. On one side of the base at a point about midway between its ends are a pair of spaced standards 2 between which a lever 3 is pivotally mounted the lever being provided with a cheese cutting knife or blade 4 which is of such size as to cover one end of a Swiss cheese, when the latter is placed on the cutter.

A feed board or platform 5 is arranged for longitudinal sliding movement on the base. The base is provided with a pair of interiorly arranged longitudinal spaced guide rods 6 and the feed board is provided on its under side with hangers 7 each of which is provided with a pair of grooved rollers 8, one of said rollers being arranged above one of the rods and the other below the same so that the said feed board is slidably connected to the said rods and the latter serve to guide the longitudinal movements of the feed board. The feed board is also provided on its under side with a rack bar 8'.

A shaft 9 is mounted in the sides of the base and transversely thereof. The said shaft is provided at its medial portion with a pinion 10 formed with a series of diagonally disposed teeth and adapted to engage the rack bar 8' of the feed board 4, and for moving the feed board longitudinally when the shaft is turned. Formed on the shaft to one side of the pinion 10 is a clutch 11', and formed on the shaft 9 to the opposite side of the pinion is a collar 12². Interposed between the collar 12' and the hub of the gearing 10 is a spring 13', for retaining the gear in mesh with the clutch. By forming the teeth of the pinion 10 diagonally, the pinion is permitted to move laterally and against the tension of the spring 13', when the desired amount of cheese has been cut, whereby the movement of the feed board 5 will not be effected when turned in one direction, but will engage the rack of the feed board and move the latter forwardly when the pinion is turned in the direction indicated by the arrow in Fig. 2. The shaft 9 and base 1 have a co-acting gage device indicated by the reference character 11 and carried by the shaft is a handle 12, the gage serving to indicate the extent of longitudinal movement of the feed board when the latter is operated by the pinion and thus serving to predetermine the thickness of the slices of cheese to be cut and the handle serving to operate the pinion shaft and the gage.

A pair of cam levers 12' is concentrically mounted upon the opposite longitudinal sides of the base 1, at a point opposite directly beneath the shaft 9. These levers are primarily adapted to lower the shaft and pinion to disengage the latter from the rack bar 8' of the feed board to allow the latter to be moved back to initial position, when it is desired to push the platform or feed board after the cheese has been used up. These levers are prevented from any accidental downward swinging movement by the contact thereof with a stop 14'.

In the operation of my invention the cheese is kept on the feed board and with its cut end closely placed against the knife, the latter being normally down. When it is desired to cut a slice of cheese the knife is first raised, the pinion shaft is turned by its handle to the required extent to move the feed board a distance corresponding to the desired thickness of the slice this being ascertained by observing the gage, and the knife is then moved downwardly across the cheese by its lever 3, thus cutting off a slice of cheese and leaving the knife close against the cut end of the cheese so as to protect it and prevent the same from drying.

Having thus described my invention, I claim:—

1. In a cheese cutter, a base, a feed board mounted for sliding movement on the base, said feed board having a rack, a lever mounted at one side of the base and having a blade or cutter movable by the lever downwardly and across the feed board, a shaft mounted in the base, a spring pressed pinion on the shaft to engage the rack bar and the feed board, means to operate said shaft, said pinion adapted to move laterally against the tension of the spring for disengaging the pinion from the rack after the cutting operation of the cheese.

2. In a cheese cutter, a base, a feed board mounted for sliding movement on the base, said feed board having a rack, a lever mounted at one side of the base and having a blade or cutter movable by the lever downwardly and across the feed board, a shaft mounted in the base, a spring pressed pinion on the shaft to engage the rack bar of the feed board, means to operate said shaft, said shaft and base having a co-acting gage device to indicate the extent of longitudinal movement of the feed board and predetermined thickness of a cut of cheese, said pinion adapted to move laterally against the tension of the spring for disengaging the pinion from the rack after the cutting operation of the cheese.

In testimony whereof I affix my signature in presence of two witnesses.

PETER LAMBERTY.

Witnesses:
FRANK A. DEPUE,
H. F. PARSONS.

Copies of this patent may be obtained for five cents each, by addressing the "Commissioner of Patents, Washington, D. C."